US012803839B2

(12) United States Patent
Choi et al.

(10) Patent No.: US 12,803,839 B2
(45) Date of Patent: Nov. 17, 2026

(54) BUILDING NETWORK PERFORMANCE BASED ON DEVICE FAILURE

(71) Applicant: Siemens Industry, Inc., Alpharetta, GA (US)

(72) Inventors: William Choi, Lake Zurich, IL (US); Anthony J. Bednaroski, Windsor, CO (US)

(73) Assignee: Siemens Industry, Inc., Alpharetta, GA (US)

( * ) Notice: Subject to any disclaimer, the term of this patent is extended or adjusted under 35 U.S.C. 154(b) by 349 days.

(21) Appl. No.: 18/626,812

(22) Filed: Apr. 4, 2024

(65) Prior Publication Data

US 2025/0317323 A1 Oct. 9, 2025

(51) Int. Cl.
*H04L 12/403* (2006.01)
*H04L 12/40* (2006.01)

(52) U.S. Cl.
CPC .... *H04L 12/403* (2013.01); *H04L 2012/4026* (2013.01)

(58) Field of Classification Search
CPC ........... H04L 12/403; H04L 2012/4026; H04L 12/2823
See application file for complete search history.

(56) References Cited

U.S. PATENT DOCUMENTS 7,437,596 B2 * 10/2008 McFarland ......... H04W 40/248 700/20
7,903,670 B2 3/2011 Ha et al.
10,348,617 B2 7/2019 Choi et al.
2007/0069850 A1 * 3/2007 Anderson, Jr. ........ G05B 15/02 700/15
2014/0321269 A1 * 10/2014 Sugawara ............... H04L 12/18 370/228
2018/0375757 A1 * 12/2018 Choi ....................... H04L 43/10
2024/0250824 A1 * 7/2024 Kornegay ............. H04L 9/3236

FOREIGN PATENT DOCUMENTS

EP 1443708 A2 8/2004

OTHER PUBLICATIONS

Steve Karg, Understanding BACnet MS/TP Encoding, Jan. 18, 2012, bacneteperts.com.*

* cited by examiner

*Primary Examiner* — Mohammad Ali
*Assistant Examiner* — Vincent W Chang

(57) ABSTRACT

A system and method is provided for facilitating building network performance based on device failure. A building automation controller includes a higher-level application and a network driver. The building automation controller transmitting a data expecting reply (DER) message to a field device in response to identifying a request for data from the higher-level application of the building automation controller. The network driver determines that the field device sent the DER message is non-communicative and transfers an error PDU message to the higher-level application in response to determining that the field device is non-communicative.

20 Claims, 7 Drawing Sheets

BUILDING NETWORK PERFORMANCE BASED ON DEVICE FAILURE

TECHNICAL FIELD

The present disclosure is directed, in general, to building automation systems that are used to control devices in a building such as HVAC equipment, blind actuators, and lighting actuators.

BACKGROUND

Building management systems encompass a wide variety of systems that aid in the monitoring and control of various aspects of building operation. Building management systems include security systems, fire safety systems, lighting systems, and heating, ventilation, and air conditioning ("HVAC") systems. Many building system utilize standard communication protocols, such as Master-Slave/Token-Passing ("MSTP"), to allow devices to communicate with each other over a building network, such as Building Automation and Control Network ("BACnet"). In some cases, the communication protocol of the building network may take a long time to identify a failed network device, whether due to a powered down device, a disconnected communication medium, or other cause of failure. Such time delays to determine whether devices are communicating properly, largely due to timeout configurations of building devices, may be exponentially worse for large building networks.

SUMMARY

One aspect is a method for facilitating building network performance based on device failure. A building automation controller transmits a data expecting reply (DER) message to a field device in response to identifying a request for data from a higher-level application of the building automation controller. A network driver of the building automation controller determines that the field device sent the DER message is non-communicative. The network driver transfers an error PDU message to the higher-level application in response to determining that the field device is non-communicative.

Another aspect is a system for facilitating building network performance based on device failure comprising a building automation controller including a higher-level application and a network driver. The building automation controller transmitting a data expecting reply (DER) message to a field device in response to identifying a request for data from the higher-level application of the building automation controller. The network driver of the building automation controller determines that the field device sent the DER message is non-communicative and transfers an error PDU message to the higher-level application of the building automation controller in response to determining that the field device is non-communicative.

Yet another aspect is a non-transitory computer readable medium including executable instructions which, when executed, causes at least one processor of a building automation controller to facilitate building network performance based on device failure. A data expecting reply (DER) message is transmitted to a field device in response to identifying a request for data from a higher-level application of the building automation controller. A network driver determines that the field device sent the DER message is non-communicative. The network driver transfers an error PDU message to the higher-level application in response to determining that the field device is non-communicative.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
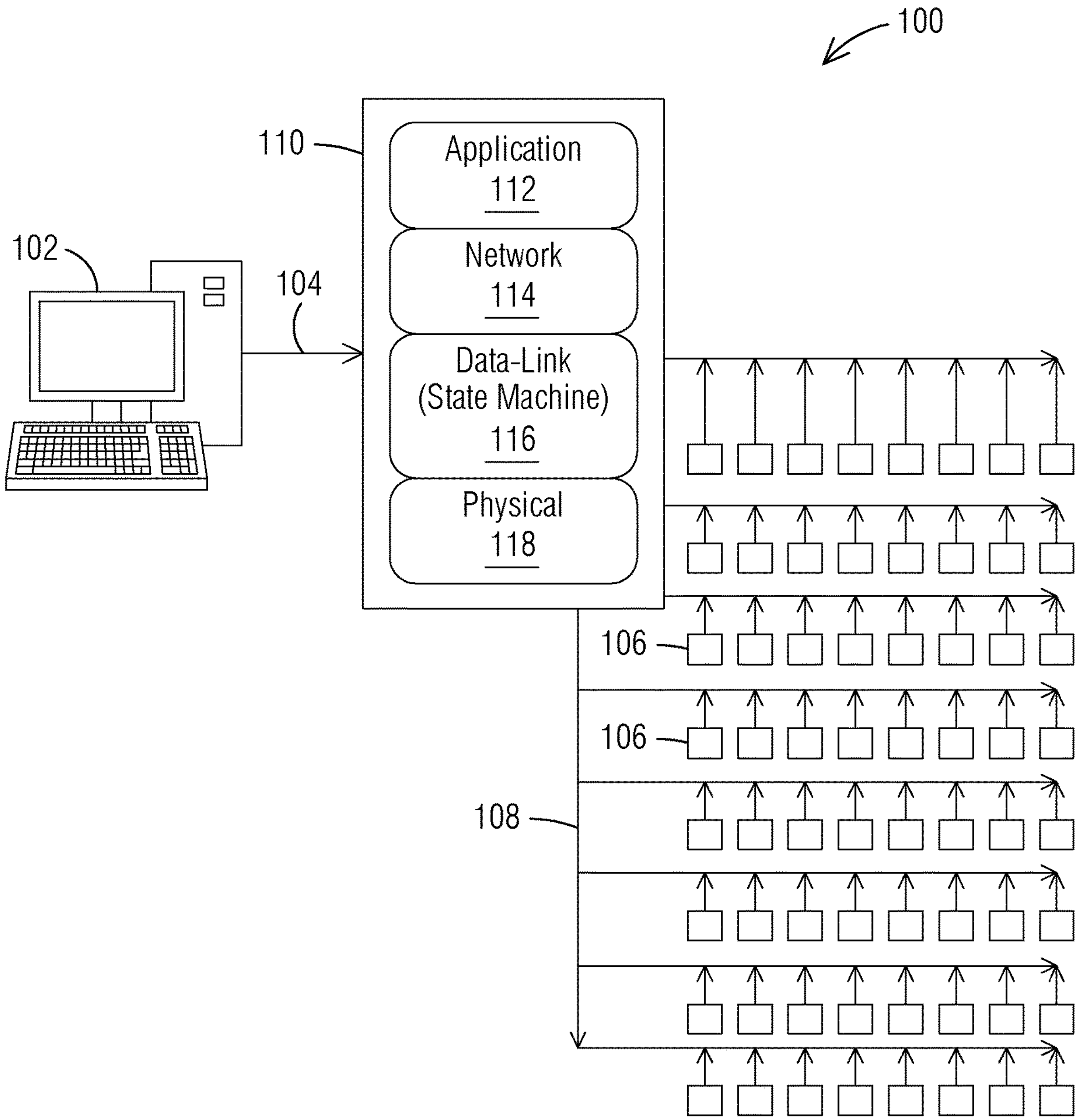
FIG. 1 illustrates a block diagram of a building automation system in simplified form.

Various technologies that pertain to systems and methods that optimizes the network performance of a building network by facilitating notification of a failed network device will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The present system provides a simulated Error Message, i.e., Error PDU, so a remote application may become aware of a device failure. Existing systems provide messages for conveying encoded building automation data between devices but they do not provide information to the remote application indicating that the requested message has failed to be received from the other device. By introducing the simulated Error Message, the application becomes aware of the failure much sooner than otherwise.

Referring to FIG. 1, there is shown an example network topology of a building automation system 100. The system 100 comprises one or more network connections or primary buses for connectivity to components of a management level network ("MLN") of the system 100. For one embodiment, the example system 100 may comprise one or more management level devices or management workstations, such as a management workstation 102, an access controller, or a remote access controller connecting through a wired or wireless network, that allows the setting and/or changing of various controls of the system. A management workstation 102 may also be a portable management workstation connecting through a wired or wireless link to an individual automation or field level device of the system 100. While a brief description of the system 100 is provided below, it will be understood that the system described herein is only one example of a simplified form or configuration for a system. The system 100 may be implemented in any other suitable manner without departing from the scope of this disclosure. The management workstations are configured to provide overall control and monitoring of automation devices, field devices, and other devices of the system 100.

For the illustrated embodiment of FIG. 1, the system 100 provides connectivity based on one or more communication protocols to one or more devices and/or subsystems for various building parameters. Although not required, examples of subsystems include, but are not limited to, an environmental/comfort subsystem and/or another subsystem, such as a security subsystems, a fire safety subsystem, and the like. Each subsystem may include various types of building automation controllers and field devices for monitoring and controlling areas within a building or group of buildings. These building automation controllers and field devices may communicate via one or more communication protocols, such as BACnet, KNX, Lon Works, Modbus, and the like.

The building automation system 100 may include the management workstation 102 on a communication network 104, such as a BACnet (IP Ethernet) network, that communicates with field devices 106 on a building network 108, such as BACnet MSTP devices on a MSTP network (RS485). Communication between the building network 108 and the communication network may be facilitated by a networking device, such as a building automation controller 110. Examples of building automation controllers include, but are not limited to, a BACnet IP/MSTP router or an MSTP room controller, such as a Siemens DXR2.M room automation station provided by Siemens Switzerland Ltd, of Zug, Switzerland.

The building automation controller 110 may include firmware that implements a network stack 112-118, such as a BACnet stack, to provide a native interface to embedded devices and applications. The network stack may include an application layer 112, a network layer 114, a data-link layer 116, and a physical layer 118. The physical layer 118 provides raw data over physical medium of the building automation controller 110. The data-link layer 116 is a higher layer than the physical layer 118 and controls the communication of data on the communication network 104 and the building network 108. The data-link layer 116 may include a state machine that manages the operation of the building automation controller 110 for transition from one state to another. The network layer 114 is a higher layer than the data-link layer 116 and the physical layer 118 and manages the physical path of data within the networks 104, 108. The application layer 112 is a higher layer than the network, data-link, and physical layers 114-118 and allows an application user to access and control network services.

As referenced above, a building automation controller 110 may include a state machine (e.g., a component/application), which is executed by a processor via accessing firmware/software executable instructions from a memory component. Such a state machine facilities communication of messages between the communication/building networks 104, 108 and the field devices 106 such as HVAC, lighting, shading equipment (actuators, sensors) that are connected to ports of the building automation controller 110 (or via a link bus). Examples of messages communicated between the management workstation 102 and the building automation controller 110 include, but are not limited to, change of value (COV) notifications, alarm notifications, read and write services, and confirmed private Services.

Figure 2:
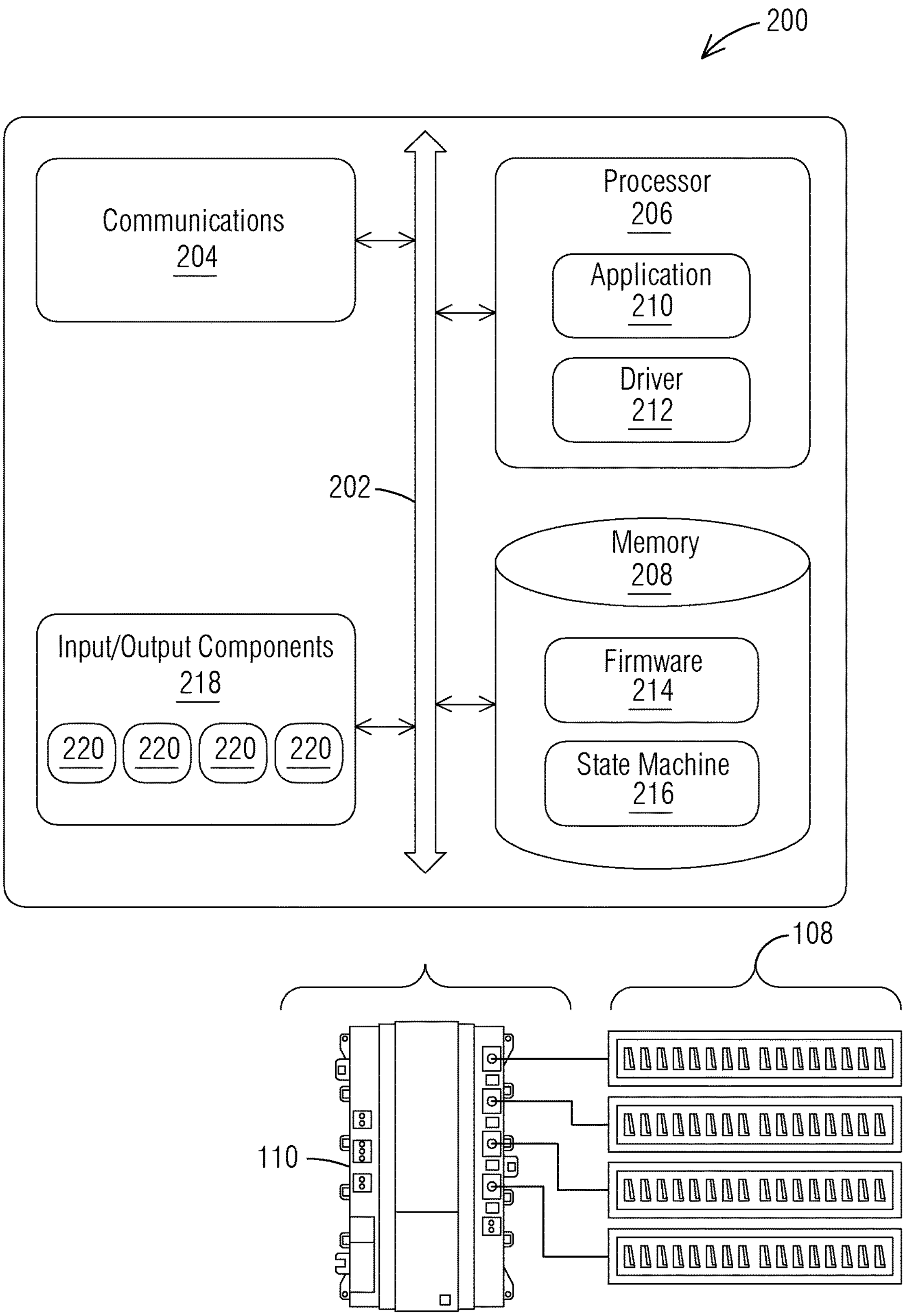
FIG. 2 illustrates a block diagram of a building automation controller in an example implementation that facilitates building network performance based on device failure.

Referring to FIG. 2, there are shown system components 200 of a building automation controller 110 in an example implementation. The system components 200 comprise one or more communication lines 202 for interconnecting other system components directly or indirectly. The other system components include one or more communication components 204 communicating with other entities via a wired or wireless network, one or more processors 206, and one or more memory components 208. The communication component 204 communicates (i.e., receives and/or transmits) data associated with one or more devices of the system 100 and its associated devices. The communication component 204 may utilize wired or wireless technology for communication.

The processor or processors 206 may send data to, and process commands received from, other components of the system components 200, such as information of the communication component 204 or the memory component 208. Each application includes executable code to provide specific functionality for the processor 206 and/or remaining components of the controllers 110. Examples of applications executable by the processor 206 include, but are not limited to, an application module 210 and a network driver module 212 ("network driver"). The application module 210 may provide one or more requests for data to a queue of the building automation controller 110. The network driver module 212 may obtain a message from the queue in response to receiving a network token of a master slave token protocol network. The network driver module 212 may further determine that the field device 106 to which the DER message was sent is non-communicative and, in response, transfer an error PDU message to the application module 210.

Data stored at the memory component 208 is information that may be referenced and/or manipulated by a module of the processor 206 for performing functions of the controllers 110. Examples of data associated with the controllers 110 and stored by the memory component 208 may include, but are not limited to, firmware instructions 214 and state machine data 216. The firmware instructions 214 provide data to the processor 206 to perform general and specific operations of the building automation controller 110. As described above, a portion of the firmware instructions 214 includes a network stack that includes one or more layers, such as include the application layer 112, the network layer 114, the data-link layer 116, and the physical layer 118. The state machine data 216 provides information to the processor 206 to execute a state machine that transitions the building automation controller 110 from one state to another. It is to be understood that, for some embodiments, the state machine data 216 may be included in the firmware instructions 214.

The system components 200 may include an input/output component 218 that manages one or more input components and/or an output component. The input/output components 218 of the system components 200 include wired or wireless connections 220, such as ports, for communication with field devices 106 on the building network 108. The input/output components 218 of the system components 200 may also include one or more visual, audio, mechanical, or other components that receive and/or provide information with a user/operator of the controller 110.

It is to be understood that FIG. 2 is provided for illustrative purposes only to represent an example implementation of the building automation controller 110 and is not intended to be a complete diagram of the various components that may be utilized by the device. The building automation controller 110, may include various other components not shown in FIG. 2, may include a combination of two or more components, or a division of a particular component into two or more separate components, and still be within the scope of the present invention. Also, the components 200 may be coupled directly or indirectly to each other to perform the operations of the building automation controller 110. For example, the processor 206 may be coupled, directly or indirectly, to the input/output component 218.

Figure 3A:
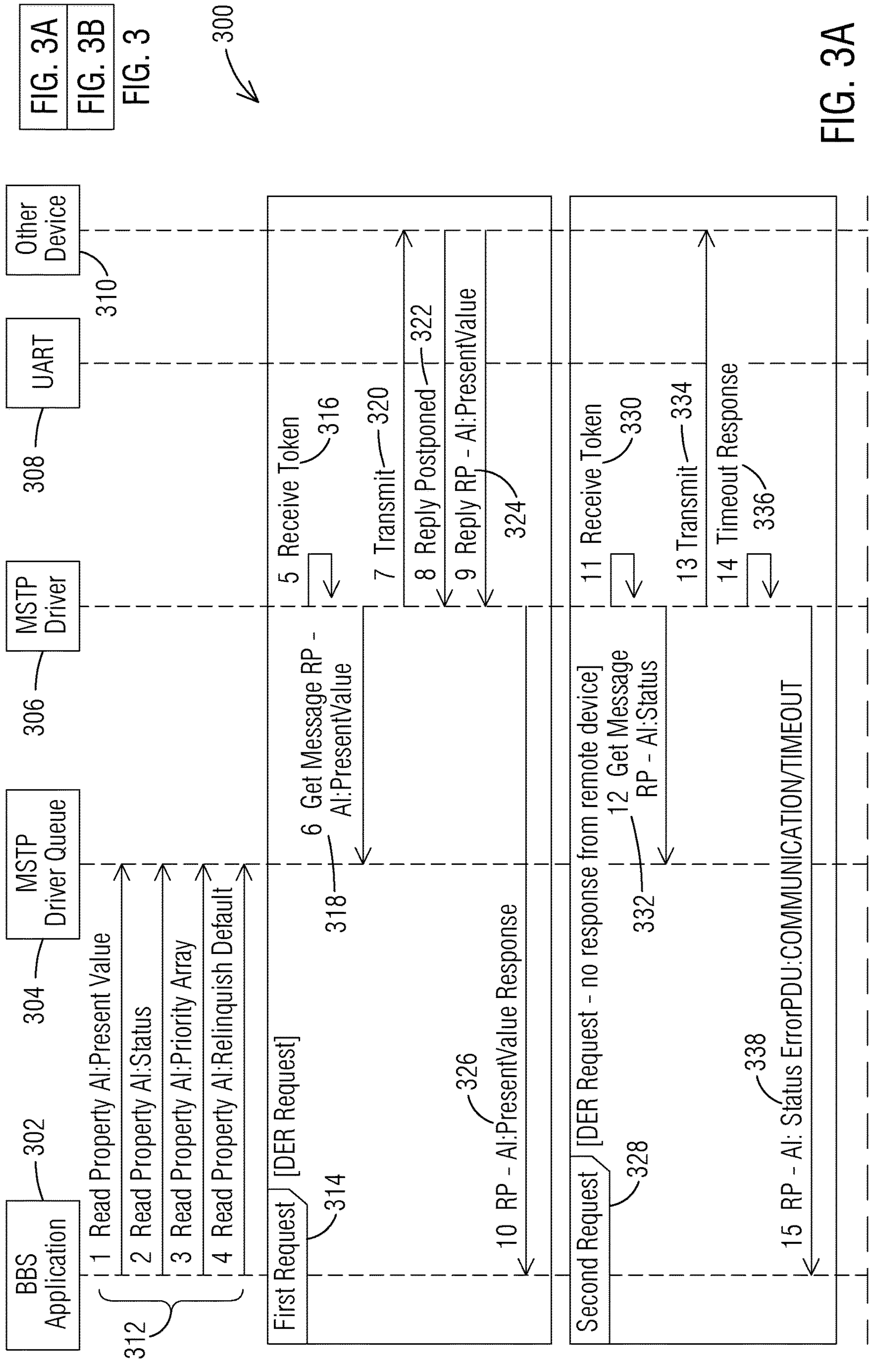
FIG. 3 illustrates a timing diagram representing an operation of the state machine of FIG. 2 in an example implementation that is operable to employ techniques described herein.
Figure 3B:
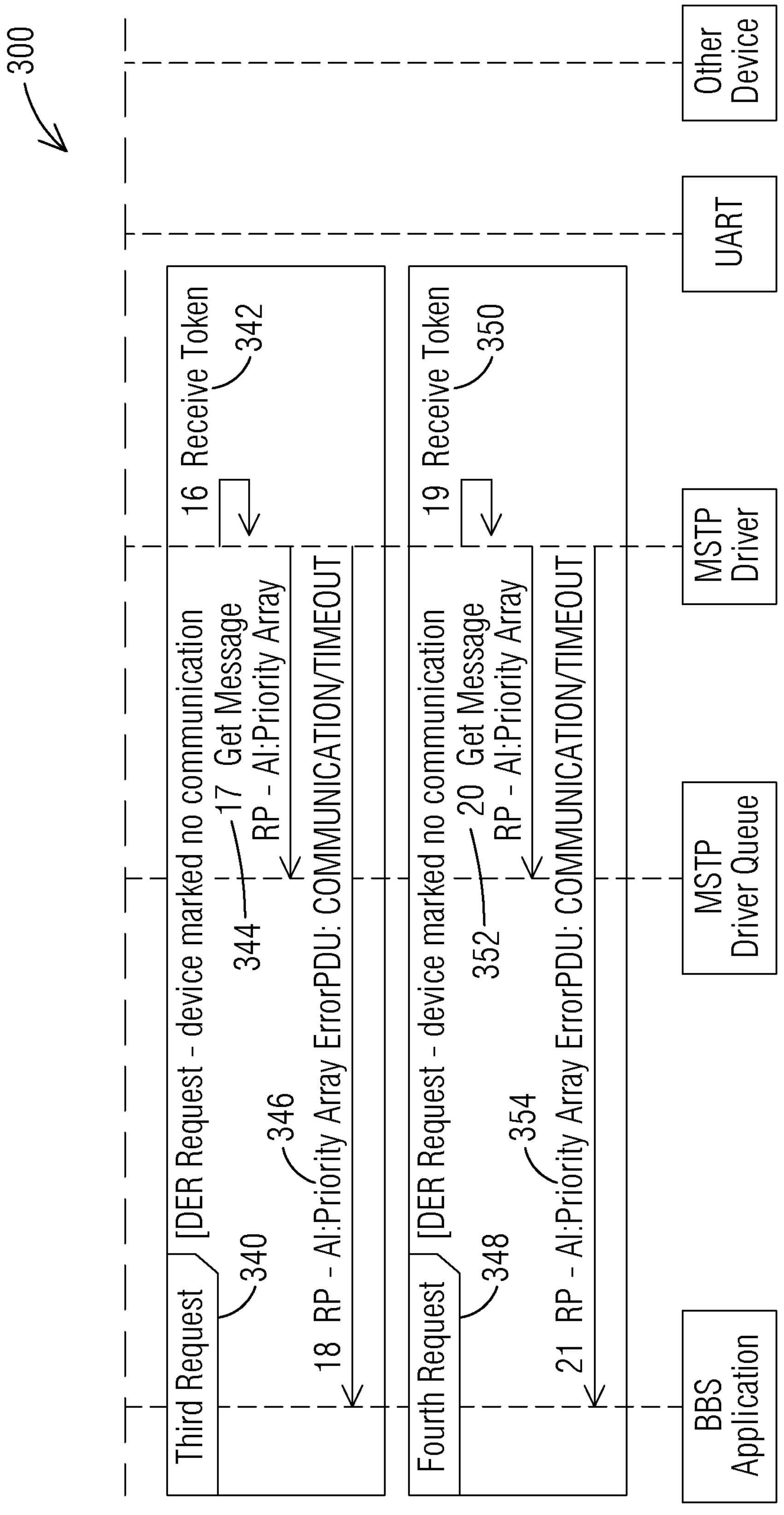

Referring to FIG. 3, there is shown a timing diagram representing operations 300 of the state machine in an example implementation that is operable to employ techniques described herein. The state machine is located at least in part at the data-link layer 116 of the network driver module 212. For some embodiments, the operations 300 may apply to the building automation controller 110 in order for the Error PDU to be intercepted and processed correctly by the data-link layer 116 and/or network driver module 212. The transmission of the Error PDU to other devices, such as conventional devices that are not capable of recognizing this simulated message, may have unexpected results. For other embodiments, the operations 300 may apply to all devices of the building network 108 if the network is a set of devices 106 that understands the Error PDU correctly.

The firmware 214 of the building automation controller 110 may include an application 302 such as a BBS Application, a driver queue 304 such as an MSTP driver queue, a network driver 306 such as an MSTP driver, a transceiver 308 such as a UART, and one or more other devices 310 such as field devices. The operations 300 of the state machine may be executed by the application 302 (module 210) and the network driver 306 (module 212) with support by one or more of the other components.

In FIG. 3, the first request 314 is a successful sequence of communication to a "other device" In the second request 328, the device is not successful (i.e., failed) and is non-communicative. After a threshold period of time after transmitting a DER message, the state machine, i.e., the network driver 306, responds with an error message back to the application 302 that no response has been received. In the third request (340) and the fourth request (348), the network driver 306 knows from the second request 328 that the target field device 310 is non-communicative so subsequent requests for data in the queue are dropped.

FIG. 3 represents several aspects 300 of a method for facilitating building network performance based on device failure. The application 302 is a higher-level application that provides (312) one or more requests for data to a queue 304 of the building automation controller 110. Examples of request for data include, but are not limited to, an analog input present value, analog input status, analog input priority array, and analog input relinquish default. Subsequent to queueing (312) one or more request for data, the network driver 306 may receive a network token from the building network 108, such as a master slave token protocol network, and obtain (318) a message from the queue in response to receiving the network token of the network. The building automation controller 110 transmits (320) a data expecting reply (DER) message to the field device 310 in response to identifying the request for data by the higher-level application of the building automation controller. In this context, identifying the request for data includes obtaining or receiving the request for data from the application 302 and/or the network driver 306.

The first request 314 represents a proper operation where the network driver 306 determines that the field device 310 sent the DER message is communicative so there is no error. The network driver 306 determines that the field device 310 is communicative because it receives a reply from the field device. For some embodiments, the network driver 306 may receive (322) a reply to the DER message from the field device 310. For some embodiments, the network driver 306 may receiving (324) a reply postponed message from the field device. The network driver 306 transfers (326), i.e., transmits, a reply non-error message to the higher-level application 302 in response to receiving (322, 324) the reply. The reply non-error message indicates to the application 302 that requested data has been received and the data may be provided to the application as appropriate.

The second request 328 represent an erroneous operation where the network driver 306 determines that the field device 310 sent the DER message is non-communicative so an error exists. The network driver 306 may receive (330) a network token and obtain (332) a message from the queue in response to receiving the network token of the network. The building automation controller 110 transmits (334) a DER message to the field device 310 in response to identifying the request for data. Subsequent to transmitting (320) the DER message to the field device 310, the network driver 306 determines (336) that the field device sent the DER message is non-communicative. For some embodiments, the network driver 306 may determine (336) that the field device is non-communicative based on a timeout response identified (e.g., generated or received) at the network driver by an absence of a reply to the DER message for a threshold period of time.

The network driver 306 transfers (338), i.e., transmits, a reply error message, namely and error PDU message, to the higher-level application 302 in response to determining (336) that the field device is non-communicative. The error PDU message indicates an error state caused by an unresponsive protocol data unit of a BACnet. In contrast to conventional systems, the network driver 306 fabricates and sends an "error" back to the application 302 indicating the communication timeout, which indicates that the target field device is not communicating. At this time, the application 302 may move on other operations without waiting for reply any further. The network driver 212, 306 operates at a data-link layer 116 of a BACnet stack of the building automation controller 110 and the higher-level application 210, 302 operates at an application layer 112 at a higher level of the BACnet stack than the data-link layer 116. The application 210, 302 performs a function of the building automation controller 110 without further delay in response to receiving (338) the error PDU message from the network driver 212, 306 by the higher-level application. One advantage is that the higher-level application is given immediate feedback if any communication is lost on the building network.

The third and fourth requests 340, 348 represent aspects of the operation 300 subsequent to the network driver 306 determining that the field device 310 sent the DER message is non-communicative. The network driver 306 may receive (342, 350) a network token and obtain (344, 352) the next message from the queue in response to receiving the network token of the network. Since the network driver 306 knows from the second request 328 that the target field device 310 is non-communicative, the network driver 306 does not transmit any type of DER message to the field device. Instead, the network driver 306 drops subsequent requests for data in the queue and transmits (346, 354) another error PDU message to the higher-level application 302 in response to identifying (344, 352) the next message in the queue.

Figure 4A:
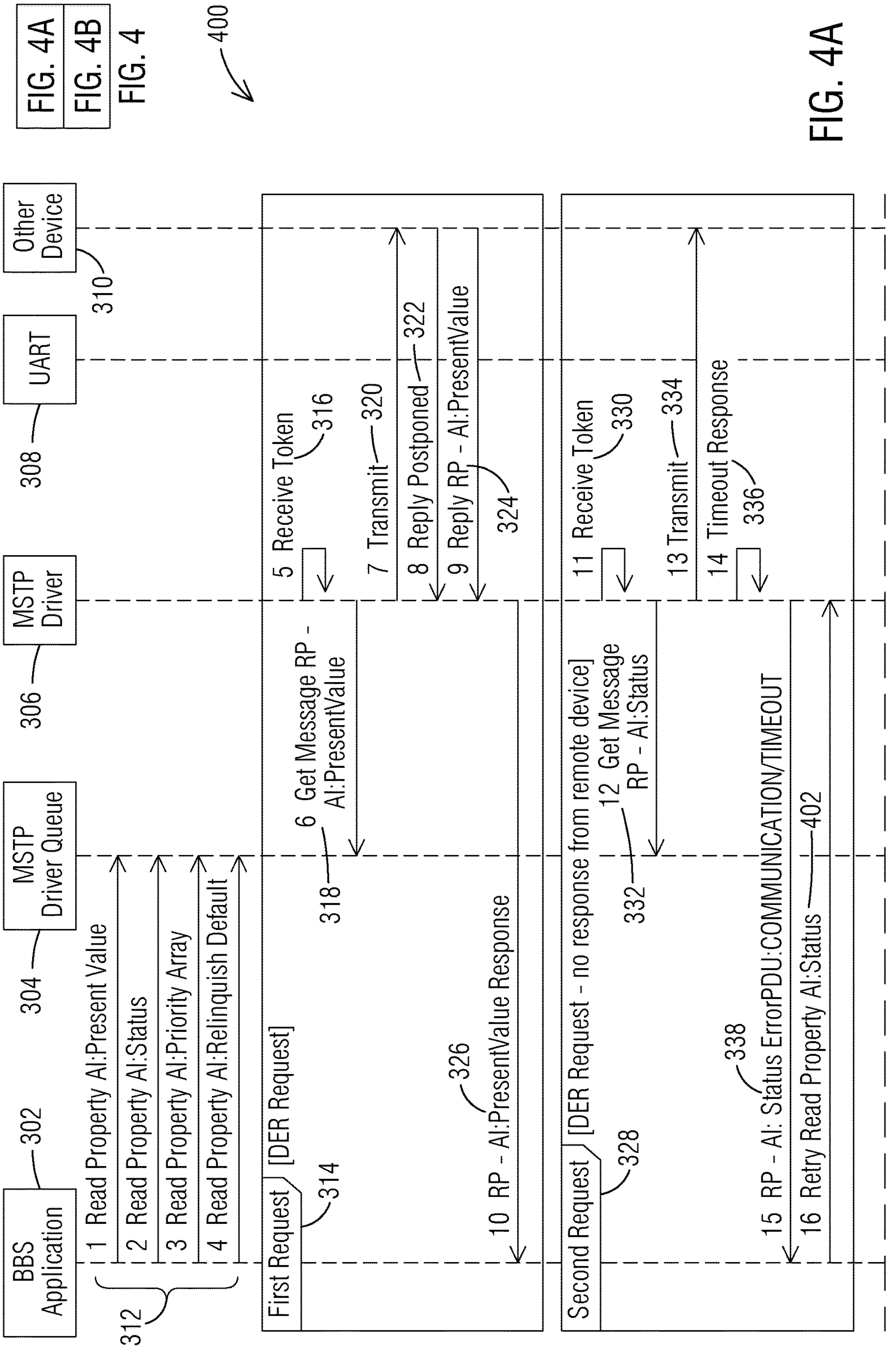
FIG. 4 illustrates a timing diagram representing another operation of the state machine of FIG. 2 in an example implementation that is operable to employ techniques described herein.
Figure 4B:
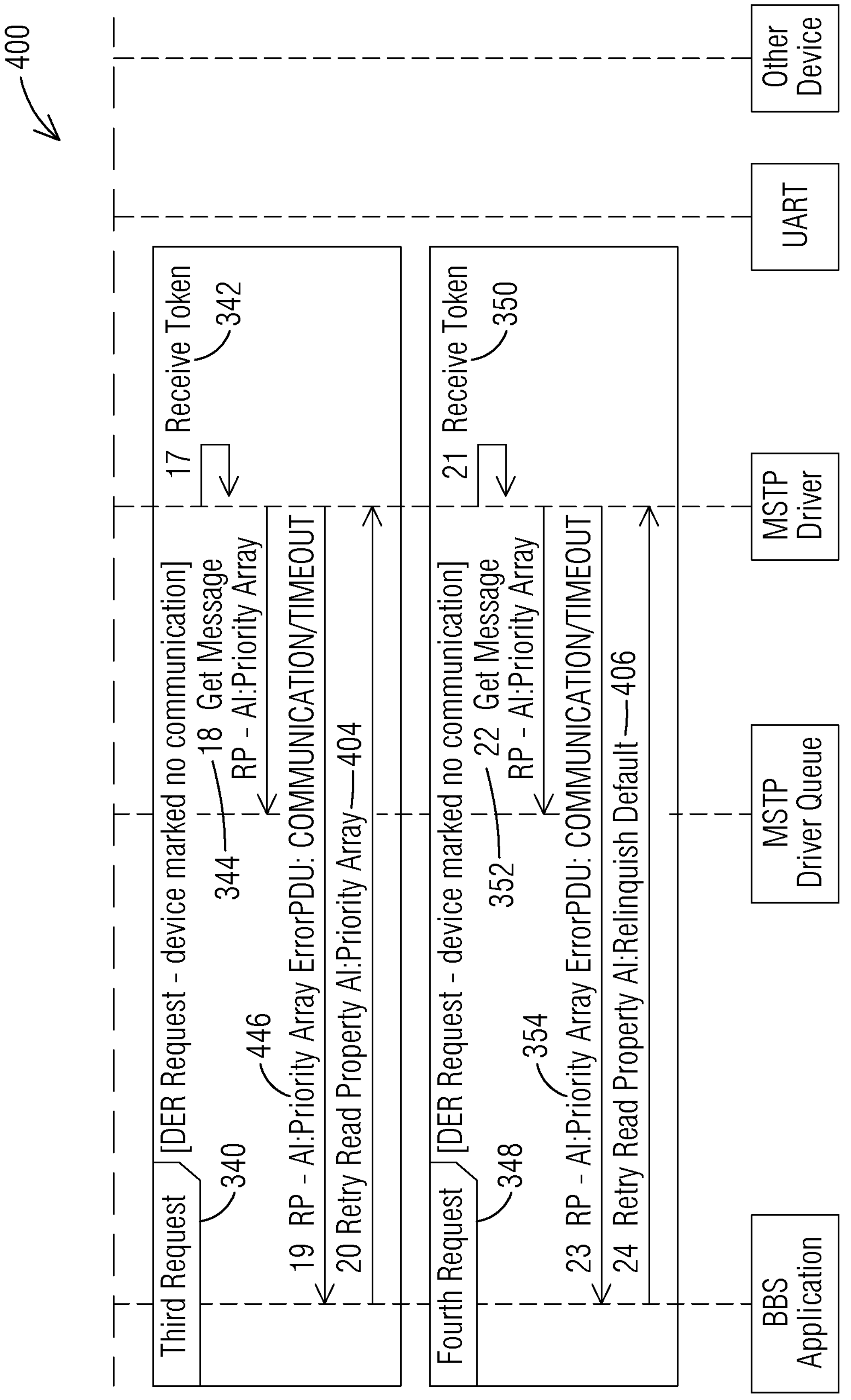

Referring to FIG. 4, there is shown a timing diagram representing other operations 400 of the state machine in an example implementation that is operable to employ techniques described herein. The operations 400 of FIG. 4 are similar to the operations 300 of FIG. 3, but the operations 400 of FIG. 4 allow for Retrys with the simulated Error PDU to minimize false failures for poorly performing networks. In particular, the higher-level application 302 may retransmit a previously transmitted request for data to the driver queue 304 or the network driver 306 in response to receiving (402) the error PDU message. For some embodiments, the higher-level application 302 may retransmit (404, 406) a previously transmitted request for data to the driver queue 304 or the network driver 306 for requests subsequent to error PDU-receiving request.

Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination of the processor with the software/firmware instructions loaded/installed into the described memory (volatile and/or non-volatile), which are currently being executed and/or are available to be executed by the processor to cause the processor to carry out the described/claimed process or function. Thus, a processor that is powered off or is executing other software/firmware, but has the described software/firmware instructions installed on a storage device in operative connection therewith (such as in a nonvolatile memory) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software and/or firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C#, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 5:
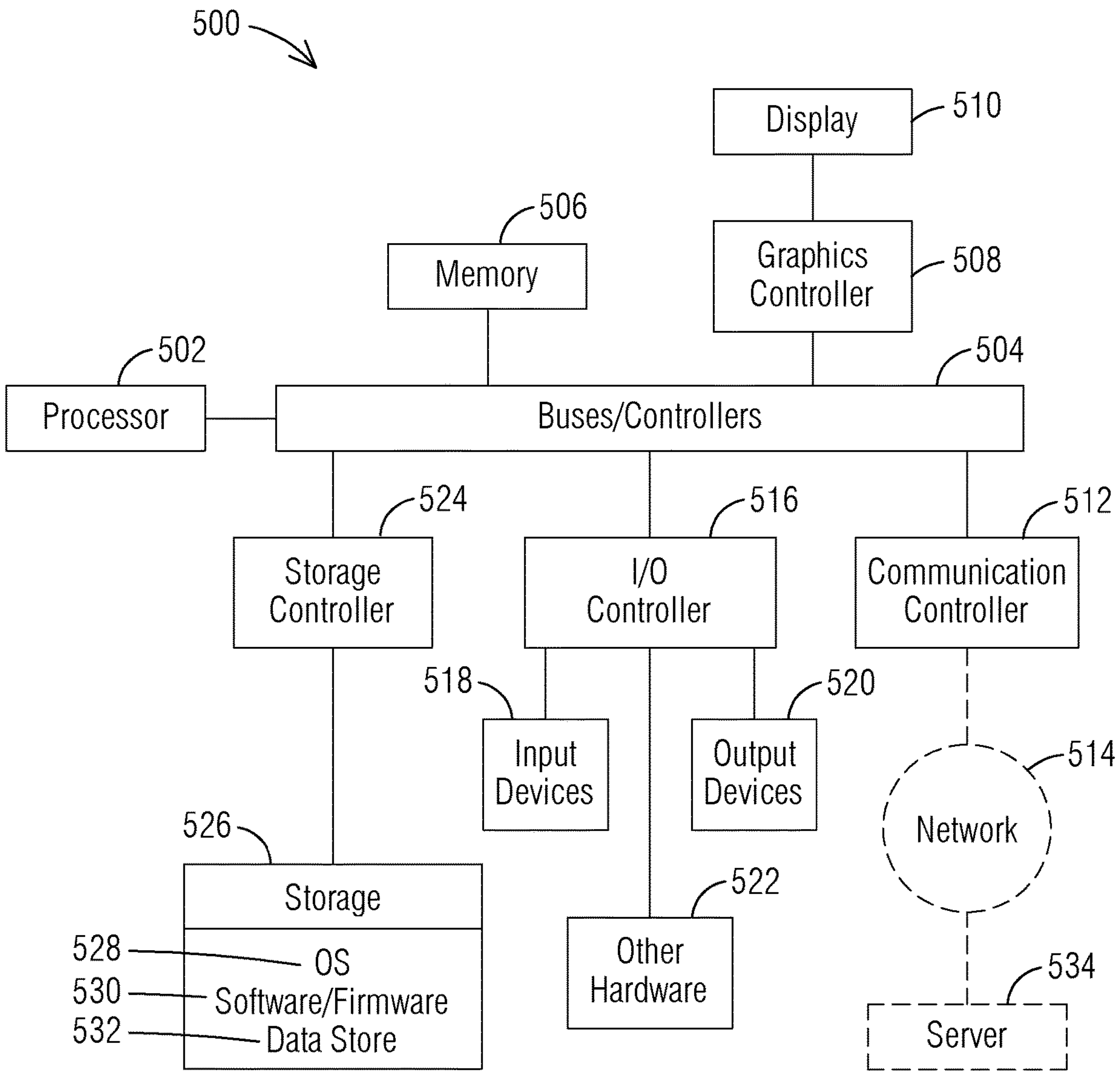
FIG. 5 illustrates a block diagram of a data processing system of FIG. 1 in which an embodiment may be implemented.

FIG. 5 illustrates a block diagram of a data processing system 500, such as the management workstation 102, controllers, and/or other devices, in which an embodiment can be implemented for some types of the devices described herein and/or other system operatively configured by computer/processor executable instructions, circuits, or otherwise to perform the functions and processes as described herein. The data processing system depicted includes at least one processor 502 (e.g., a CPU) that may be connected to one or more bridges/controllers/buses 504 (e.g., a north bridge, a south bridge). One of the buses 504, for example, may include one or more I/O buses such as a PCI Express bus. Also connected to various buses in the depicted example may include a main memory 506 (RAM) and a graphics controller 508. The graphics controller 508 may be connected to one or more display devices 510 (e.g., LCD or AMOLED display screen, monitor, VR headset, and/or projector). It should also be noted that the processor 502 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 512 (Ethernet controllers, Wi-Fi controllers, cellular controllers) operative to connect to a local area network (LAN), Wide Area Network (WAN), a cellular network, and/or other wired or wireless networks 514 or communication equipment.

Further components connected to various busses may include one or more I/O controllers 516 such as USB controllers, Bluetooth controllers, and/or dedicated audio controllers (connected to speakers and/or microphones). It should also be appreciated that various peripherals may be connected to the I/O controller(s) (via various ports and connections) including input devices 518 (e.g., keyboard, mouse, pointer, touch screen, touch pad, drawing tablet, trackball, buttons, keypad, game controller, gamepad, camera, microphone, scanners, motion sensing devices that capture motion gestures), output devices 520 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 502 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 522 connected to the I/O controllers 516 may include any type of device, machine, or component that is configured to communicate with a data processing system.

Additional components connected to various buses may include one or more storage controllers 524 (e.g., SATA). A storage controller may be connected to a storage device 526 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 504 such as a PCI Express bus.

A data processing system in accordance with an embodiment of the present disclosure may include an operating system 528, software/firmware 530, and data stores 532 (that may be stored on a storage device 526 and/or the memory 506). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 512 may be connected to the network 514 (which may or may not be a part of a data processing system 500), which can be any local, wide area, remote, private, and/or public data processing system network or combination of networks, as known to those of skill in the art, including the Internet. Data processing system 500 can communicate over the network 514 with one or more other data processing systems such as a server 534 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term “controller” means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 502 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 500 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 500 may conform to any of the various current implementations and practices known in the art.

This application incorporates by reference U.S. Pat. No. 10,348,617 B2, titled System and Method for Stabilizing a BACnet MSTP Network when Failures Occur, by William Choi and Timothy Stevens, granted on Jul. 9, 2019, in its entirety.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

The invention claimed is:

1. A method for facilitating building network performance based on device failure comprising:

transmitting, by a building automation controller, a data expecting reply (DER) message to a field device in response to identifying a request for data from a higher level application of the building automation controller;

determining, by a network driver of the building automation controller, that the field device sent the DER message is non-communicative; and fabricating and transferring an error PDU message from the network driver of the building automation controller to the higher-level application of the building automation controller in response to determining that the field device is non-communicative.

2. The method according to claim 1, wherein the error PDU message indicates an error state caused by an unresponsive protocol data unit of a BACnet.

3. The method according to claim 1, wherein the network driver operates at a data-link layer of a BACnet stack of the building automation controller and the higher-level application operates at an application layer at a higher level of the BACnet stack than the data-link layer.

4. The method according to claim 1, wherein determining that the field device is non-communicative includes determining that the field device is non-communicative based on a timeout response identified at the network driver by an absence of a reply to the DER message for a threshold period of time.

5. The method according to claim 1, further comprising transferring a reply non-error message from the network driver to the higher-level application in response to at least one of either receiving a reply to the DER message from the field device or receiving reply postponed message from the field device.

6. The method according to claim 1, wherein performing a function of the building automation controller without further delay in response to receiving the error PDU message from the network driver by the higher-level application.

7. The method according to claim 1, further comprising:

providing, by the higher-level application, one or more requests for data to a queue of the building automation controller; and obtaining, by the network driver, a message from the queue in response to receiving a network token of a master slave token protocol network.

8. A system for facilitating building network performance based on device failure comprising:

a building automation controller including a higher-level application and a network driver, the building automation controller transmitting a data expecting reply (DER) message to a field device in response to identifying a request for data from the higher-level application of the building automation controller, wherein the network driver of the building automation controller determines that the field device sent the DER message is non-communicative, and fabricates and transfers an error PDU message to the higher-level application of the building automation controller in response to determining that the field device is non-communicative.

9. The system according to claim 8, wherein the error PDU message indicates an error state caused by an unresponsive protocol data unit of a BACnet.

10. The system according to claim 8, wherein the network driver operates at a data-link layer of a BACnet stack of the building automation controller and the higher-level application operates at an application layer at a higher level of the BACnet stack than the data-link layer.

11. The system according to claim 8, wherein the network driver determines that the field device is non-communicative based on a timeout response identified at the network driver by an absence of a reply to the DER message for a threshold period of time.

12. The system according to claim 8, wherein the network driver transfers a reply non-error message to the higher-level application in response to at least one of either receiving a reply to the DER message from the field device or receiving reply postponed message from the field device.

13. The system according to claim 8, wherein the building automation controller performs a function without further delay in response to the higher-level application receiving the error PDU message from the network driver.

14. The system according to claim 8, wherein the higher-level application provides one or more requests for data to a queue of the building automation controller; and the network driver obtains a message from the queue in response to receiving a network token of a master slave token protocol network.

15. A non-transitory computer readable medium including executable instructions which, when executed, causes at least one processor of a building automation controller to facilitate building network performance based on device failure by:

transmitting a data expecting reply (DER) message to a field device in response to identifying a request for data from a higher-level application of the building automation controller;

determining, by a network driver, that the field device sent the DER message is non-communicative; and fabricating and transferring an error PDU message from the network driver to the higher-level application in response to determining that the field device is non-communicative.

16. The non-transitory computer readable medium according to claim 15, wherein the error PDU message indicates an error state caused by an unresponsive protocol data unit of a BACnet.

17. The non-transitory computer readable medium according to claim 15, wherein the network driver operates at a data-link layer of a BACnet stack of the building automation controller and the higher-level application operates at an application layer at a higher level of the BACnet stack than the data-link layer.

18. The non-transitory computer readable medium according to claim 15, wherein determining that the field device is non-communicative includes determining that the field device is non-communicative based on a timeout response identified at the network driver by an absence of a reply to the DER message for a threshold period of time.

19. The non-transitory computer readable medium according to claim 15, further comprising transferring a reply non-error message from the network driver to the higher-level application in response to at least one of either receiving a reply to the DER message from the field device or receiving reply postponed message from the field device.

20. The non-transitory computer readable medium according to claim 15, wherein performing a function of the building automation controller without further delay in response to receiving the error PDU message from the network driver by the higher-level application.

* * * * *